US008768101B1

(12) United States Patent
Repperger et al.

(10) Patent No.: US 8,768,101 B1
(45) Date of Patent: Jul. 1, 2014

(54) TARGET IMAGE REGISTRATION AND FUSION

(75) Inventors: Daniel W. Repperger, Dayton, OH (US); Rodney G. Roberts, Tallahassee, FL (US); Alan R. Pinkus, Bellbrook, OH (US); Robert D. Sorkin, St. Augustine, FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 545 days.

(21) Appl. No.: 13/174,723

(22) Filed: Jun. 30, 2011

Related U.S. Application Data

(60) Provisional application No. 61/360,053, filed on Jun. 30, 2010.

(51) Int. Cl.
G06K 9/32 (2006.01)

(52) U.S. Cl.
USPC ............ 382/296; 382/103; 382/289; 382/294

(58) Field of Classification Search
USPC .................. 382/103, 104, 284, 291, 294–297
See application file for complete search history.

(56) References Cited

U.S. PATENT DOCUMENTS

| | | | |
|---|---|---|---|
| 6,201,541 B1 * | 3/2001 | Shalom et al. ................. | 345/419 |
| 6,360,027 B1 | 3/2002 | Hossack et al. | |
| 6,785,427 B1 * | 8/2004 | Zhou .............................. | 382/294 |
| 6,859,549 B1 * | 2/2005 | Oliensis ......................... | 382/154 |
| 6,880,755 B2 | 4/2005 | Gorbet et al. | |
| 6,935,562 B2 | 8/2005 | Hecht et al. | |
| 7,030,808 B1 | 4/2006 | Repperger et al. | |
| 7,123,779 B2 | 10/2006 | Beuker et al. | |
| 7,136,518 B2 | 11/2006 | Griffin et al. | |
| 7,184,890 B2 | 2/2007 | Boright et al. | |
| 7,199,366 B2 | 4/2007 | Hahn et al. | |
| 7,201,715 B2 | 4/2007 | Burdette et al. | |
| 7,228,006 B2 | 6/2007 | Stubler et al. | |
| 7,460,733 B2 * | 12/2008 | Xiao et al. ..................... | 382/294 |
| 7,844,133 B2 * | 11/2010 | Spence et al. .................. | 382/294 |
| 7,912,283 B1 * | 3/2011 | Repperger et al. ............. | 382/168 |
| 2002/0018589 A1 * | 2/2002 | Beuker et al. .................. | 382/132 |
| 2002/0154812 A1 * | 10/2002 | Chen et al. ..................... | 382/154 |
| 2007/0009135 A1 * | 1/2007 | Ishiyama ........................ | 382/103 |
| 2008/0002023 A1 * | 1/2008 | Cutler ............................. | 348/36 |
| 2011/0012898 A1 * | 1/2011 | Krishnan et al. .............. | 345/419 |
| 2011/0064271 A1 * | 3/2011 | Wang .............................. | 382/103 |
| 2013/0243352 A1 * | 9/2013 | Khurd et al. ................... | 382/284 |

OTHER PUBLICATIONS

Will, T., "Introduction to the Singular Value Decompostion," http://www.uwlax.edu/faculty/will/svd/, 1999 (accessed Feb. 18, 2014).

(Continued)

*Primary Examiner* — Wesley Tucker
(74) *Attorney, Agent, or Firm* — AFMCLO/JAZ; Frederic Sinder

(57) ABSTRACT

A new optical imaging process for how to best fuse information from multiple target images into a single target image is described. The process has two primary components. First, rotating, translating and scaling each target image to register or calibrate them against a reference image and, second, determining weighing factors for each thus registered target image to select those images which add value to a final target image. The first component determines optimal rotational and translation matrices by a least squares measure using singular value decomposition. The second component determines weighing factors using correlations and statistical signal analysis techniques.

1 Claim, 15 Drawing Sheets

(56) References Cited

OTHER PUBLICATIONS

Wikipedia contributors, "Singular Value Decomposition," Wikipedia, The Free Encyclopedia, http://en.wikipedia.org/w/index.php?title=Singular_value_decomposition&oldid=354367751 (accessed Feb. 18, 2014).

Golub, F., et al, "An Analysis of the Total Least Squares Problem," Society for Industrial and Applied Mathematics, Siam J. Numer. Anal., vol. 17, No. 6 (Dec. 1980).

Sheen, T., "Singular Value Decomposition in Digital Signal Processing," htp://math.missouristate.edu/assets/Math/SVDsignal.ppt (accessed Feb. 14, 2014).

K. Saitwal, A. A. Maciejewski, R. G. Roberts, and B. A. Draper, "Using the Low-Resolution Properties of Correlated Images to Improve the Computational Efficiency of Eigenspace Decomposition," IEEE Transactions on Image Processing, vol. 15, No. 8, pp. 2376-2387 (Aug. 2006).

K. S. Arun, T. S. Huang, and S. D. Blostein, Least-squares fitting of two 3-D Point Sets, IEEE Trans. on Pattern Analysis and Machine Intelligence, vol. PAMI-9, No. 5, pp. 698-670 (Sep. 1987).

I. Y. Hoballah and P. K. Varshney, "An Information theoretic Approach to the Distributed Detection Problem," IEEE Transactions on Information Theory, 35(5), pp. 988-994 (1989).

R. Viswanathan and P. K. Varshney, "Distributed Detection with Multiple Sensors: Part I—Fundamentals," Proceedings of the IEEE, vol. 85, No. 1, pp. 54-63 (1997).

Blum, R. et al, "Distributed Detection with Multiple Sensors: Part II—Advanced Topics," Proceedings of the IEEE, vol. 85, No. 1, pp. 54-63 (1997).

Challis, J., "A Procedure for Determining Rigid Body Transformation Parameters," J. Biomechanics, vol. 28, No. 6, pp. 773-737 (1995).

Andrews, Harry C.; Patterson, C., III, "Singular Value Decomposition (SVD) Image Coding," Communications, IEEE Transactions on , vol. 24, No. 4, pp. 425, 432 (Apr. 1976).

Bebis, G., "Singular Value Decomposition (SVD)," http://www.cse.unr.edu/~bebis/CS485/Lectures/SVD.ppt (accessed Feb. 14, 2014).

Wa, Y. K., "Singular Value Decomposition," http://cklixx.people.wm.edu/teaching/m2999-3f.ppt (accessed Feb. 14, 2014).

* cited by examiner

Noise η(t) and Signal + Noise = S(t) + η(t)

TARGET IMAGE REGISTRATION AND FUSION

CROSS REFERENCE TO RELATED PATENT APPLICATIONS

This application claims priority under 35 U.S.C. §119(e) from U.S. provisional application 61/360,053, filed Jun. 30, 2010 and titled "Image Registration and Fusion Optimization." The invention description contained in that provisional application is incorporated by reference into this description.

This application is related to U.S. patent application Ser. No. 12/471,543, filed May 26, 2009, titled "Dynamic Image Registration" and identified as Air Force invention number AFD 1001, but does not claim priority under 35 U.S.C. §120 to its filing date. The invention description in that application is incorporated by reference into this description.

This application is also related to U.S. patent application Ser. No. 11/805,262, filed May 18, 2007, titled "Visual Object Identification by Computational Majority" and identified as Air Force invention number AFD 935, but does not claim priority under 35 U.S.C. §120 to its filing date. The invention description in that application is incorporated by reference into this description.

This application is also related to U.S. patent application Ser. No. 11/900,137, filed May 30, 2007, titled "Quantitative Measurements of System Complexity" and identified as Air Force invention number AFD 813, but does not claim priority under 35 U.S.C. §120 to its filing date. The invention description in that application is incorporated by reference into this description.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical imaging, and more particularly to how to best fuse target information from multiple images into a single target image.

One approach for optical target recognition, usually for viewing by a human operator, fuses multiple target images with respect to a reference image of interest, often merely the first target of many target images. The goal is to create a fused image that is optimally "information rich" to a human operator at a lowest computational cost.

The reference image is usually an original optical image produced by a digital imaging device such as a digital camera. Modern military systems may include a variety of additional sensor devices able to produce images based not only on multiple electromagnetic radiation frequencies, so-called multi-spectral images that include frequencies below and above the normal visual range, but also based on other than electromagnetic radiation.

A particular problem is computation cost, particularly computational speed.

Complicating this process is that an original reference image may be compromised by having too little or too much light, reduced contrast or size, and cluttered with other objects that confuse a user, as well as other possible image defects.

It is, therefore, an object of the present invention to provide new and improved methods for fusing target information from multiple images into a single target image.

SUMMARY OF THE INVENTION

The present invention provides new solutions for some of the problems in the prior art for how to best fuse target information from multiple images into a single target image. It includes two primary solution components.

First, initial calibration and registration of the multiple image sources is performed in an optimal sense to produce the lowest position error by a least squares measure using singular value decomposition.

Second, an optimality procedure to employ only those target images that add value is accomplished by a statistical approach based on maximum likelihood values. Specifically, selection of appropriate target images can be converted into a simple identification problem of discerning signal versus noise and employing likelihood functions to select target images that, in an analogous sense, include a signal over and above the "noise" of a reference image. Elimination of target images that only add correlation or bias is accomplished and this method "data mines" or weeds out those target images that add little new information to data already gleaned from the first solution component of the invention. A sieve method is employed to sift through the candidate target images to see if they add any new information content to the decision making process and to filter out those target images that do not add new and relevant information.

Accordingly, the present invention is directed to a method for determining an optimal rotational matrix $R_{T_i}$ and an optimal translation vector $TR_{T_i}$ for registering and calibrating a target image with a reference image $I_R$, by solving for a least squares fitting of the two images using singular value decomposition.

The present invention is also directed to a method for determining weighing factors for fusing target images with a reference image, the target images having been first registered and calibrated against a reference image matrix to create transformed target image matrices, comprising the steps of generating a difference image matrix for each transformed target image by subtracting each transformed target image matrix from the reference image matrix, generating a correlation matrix of each difference image matrix, generating a norm squared value for each correlation matrix, defining a threshold scalar value determined from an image having only noise, for each norm squared value less than the threshold scalar value, assigning that norm squared value as the weighing factor for its associated target image, selecting any single remaining transformed target image matrix not having an assigned weighing factor, generating a difference image matrix for each other remaining transformed target image by subtracting each other remaining transformed target image matrix from the next remaining target image matrix, generating a correlation matrix of each difference image matrix, generating a norm squared value for each correlation matrix, for each norm squared value less than the threshold scalar value, assigning that norm squared value as the weighing factor for its associated target image, and, repeating selecting any single remaining non-assigned transformed target image matrix step until a weighing factor has been assigned for all target images.

DETAILED DESCRIPTION

The invention has two primary components:

First, rotating, translating and scaling target images to match a reference image; and, Second, weighing each rotated, translated and scaled target image to select those target images that add value to a final fused image.

Figure 1:
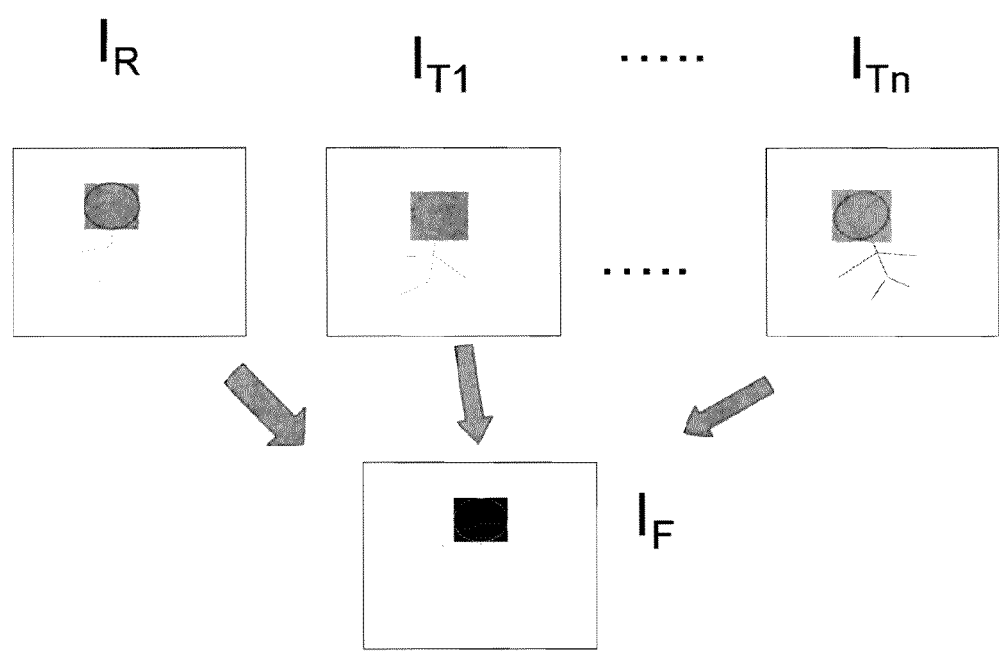
FIG. 1 is a representational view of the image registration and fusion problem of interest.

Optimal image fusion is a two step process, requiring:

Referring now to the drawings, FIG. 1 is a representational view of the image registration-fusion problem of interest, showing sources of image information comprising a baseline reference image $I_R$ and a number of target images $I_{T1}$, $I_{T2}$ ... $I_{Tn}$ from n other image sources. The problem is how to best combine and fuse target images with a reference image into a single fused target image $I_F$. The present invention solves two major parts of the image registration and fusion problem.

First, how to best align target images $I_{T1}$ ... $I_{Tn}$ with respect to reference image $I_R$, the registration and calibration problem.

Second, how to select (in some rank-order) which candidate images $I_{Tn}$ images add value to the final fused image.

The present invention solves those two problems with two solution components, the first directed to the just described first part of the problem and the second directed to the just described second part of the problem.

The first solution component is how to optimally register and calibrate original image source $I_R$ with respect to reference image $I_R$.

Figure 2:
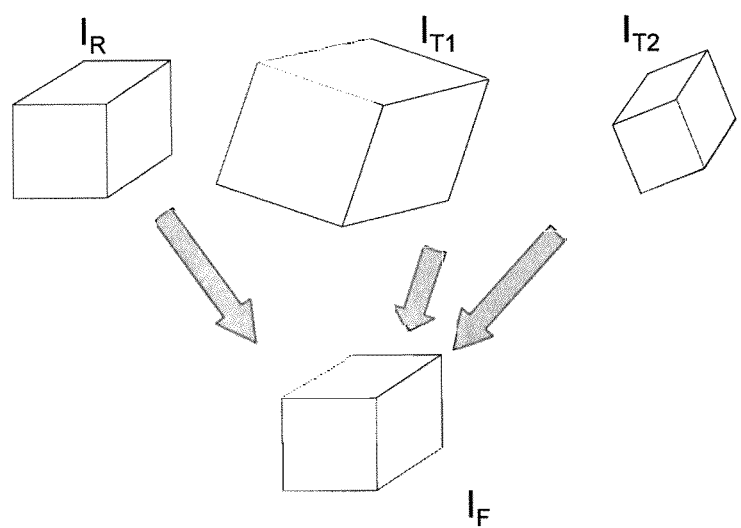
FIG. 2 is an illustration of an example of how the first solution component of the present invention will work.

FIG. 2 shows a hypothetical example of how the first solution component will work. As before, FIG. 2 shows a reference image $I_R$ and two possible target images $I_{T1}$ and $I_{T2}$ taken at different wavelengths from what may be different sensors or sources. $I_F$ is the final, fused image in which the data from reference image $I_R$ and the two target images $I_{T1}$ and $I_{T2}$ are combined into a fused image $I_F$. Fused image $I_F$ is more "information rich" than reference image $I_R$, containing data from target images $I_{T1}$ and $I_{T2}$ as well as from reference image $I_F$. A technique termed "skeletonization" is performed on each target image to identify edges and transfer salient information about edge locations of the target images to add value to a final, fused image from the various sources. The final, fused image will provide a human operator a better understanding of the objects in an information rich image rendering. In order to adequately convey and register the data from the reference and target images, several transformations have to be performed. The target images may have to be rotated, translated and scaled upward or downward in size to reach some similarity to the reference image. This is typical of the use of multiple image sources. In practice, the target images may have a different number of pixels, a different size or orientation, and have a different field of view or other inconsistencies with respect to the reference image $I_R$.

Target images $I_{T1}$ and $I_{T2}$ were deliberately drawn to add information to reference image $I_R$ to illustrate the approach. Not all target images will add significant information to a reference image. The second solution component is how to selectively garner information from all candidate target images $I_{Ti}$ so that a final fused image is further enriched with combined information from the reference image and some carefully selected target images.

Figure 3:
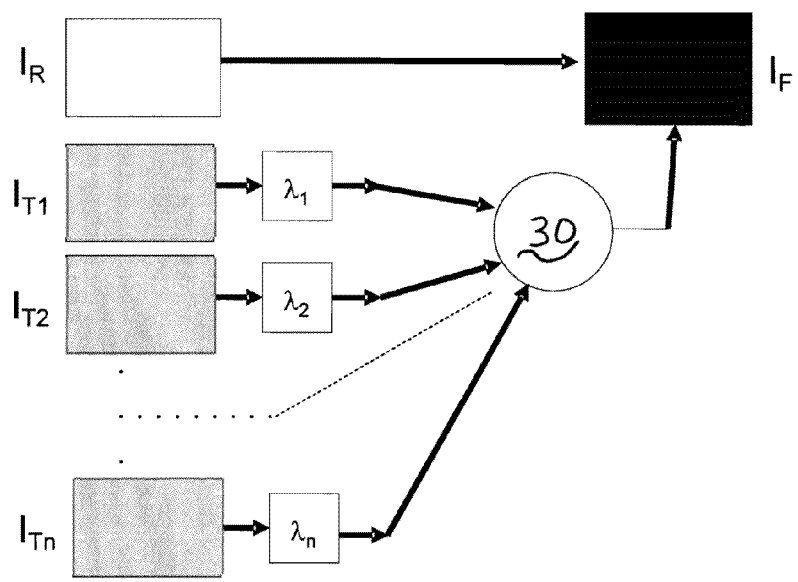
FIG. 3 is an illustration of an example of how the second solution component of the present invention will work.

FIG. 3 is an illustrative view of the second solution component of optimally combining or selecting target images $I_{T1}$ ... $I_{Tn}$.

The goal is to develop a procedure, that is, select a scaling factor to weigh the set of target images $I_{Ti}$ in such a manner that they add new information content to a finally fused image $I_F$. A decision mechanism 30 will be used to select, or eliminate, target images based on the respective values.

First Solution Component

Calibration and Registration of Target Images to Reference Image

Returning now to FIG. 2, the first component of calibration and registration is described, that is, how to carefully calibrate and register the initial image gathering system in an optimal manner.

As before, $I_R$ represents reference image $I_{T1}$, $I_{T1}$ and $I_{T2}$ represent the two target images, and $I_F$ represents the final fused image $I_F$. An affine (linear) transformation of an arbitrary target image is defined as follows:

$$\text{Output Image} = (\text{scale factor}) * (R_{Ti} * (\text{Input Image}) + TR_{Ti}) \quad (1)$$

The scale factor in equation (1) provides the necessary linear scaling and down/up sampling so that the relative size of the target images concurs with the reference image. The $R_{Ti}$ matrix in equation (1) is an orientation matrix (affine transformation) which rotates the target image so that it will coincide with the reference image. The translation vector $TR_{Ti}$ represents linear displacement of the target image $I_{Ti}$ so that spatial differences between the reference and the target images will be made close to zero. All affine or linear transformations are made with respect to reference image $I_R$. $SF_{Ti}$ denotes the scale factor term in equation (1) specific to each target image $I_{Ti}$, with $R_{Ti}$ and $TR_{Ti}$ representing the respective rotations and translations of each target image $I_{Ti}$. FIG. 2 can now be described in equation form by writing the fused image $I_F$ in terms of the reference image $I_R$ and the two target images $I_{T1}$ and $I_{T2}$ as follows:

$$I_F = I_R + (SF_{T1}) * (R_{T1} * (I_{T1}) + TR_{T1}) + (SF_{T2}) * (R_{T2} * (I_{T2}) + TR_{T2}) \quad (2)$$

All the transformations in FIG. 2 and equation (2) are linear (affine) and final fused image $I_F$ is just a linear combination of the constituent images $I_{T1}$ and $I_{T2}$ to reference image $I_R$ (when properly scaled, rotated and translated). What is different in this invention from the prior art is an optimal choice of scale factors and the $R_{Ti}$ and the $TR_{Ti}$ terms in equations (1) and (2) for each target image $I_{Ti}$. The optimum choice of scale factor term $SF_{Ti}$, rotational matrix $R_{Ti}$ and translation matrix $TR_{Ti}$ to produce minimum registration and calibration error is determined as follows.

Optimal choices of $SF_{Ti}$, $R_{Ti}$, and $TR_{Ti}$ can be solved using algorithms that can be numerically computed. For notational simplicity, let $\overline{SF_{Ti}}, \overline{R_{Ti}}, \overline{TR_{Ti}}$ denote these optimum quantities.

To determine optimal values for affine parameters $R_{Ti}$ and $TR_{Ti}$ in equation (2), use is made of the singular value decomposition (SVD) of a matrix. Using MATLAB® or other matrix software, the SVD of a matrix D is given by:

$$D = U \delta V^T \tag{3}$$

where superscript T denotes matrix transpose and the matrices U and V are orthogonal matrices ($UU^T = I_n$, and $VV^T = I_m$, which are identity matrices of possible different dimensions (m≠n). The variable δ consists of a diagonal matrix which has elements called the singular values. The singular values satisfy:

$$\sigma_1 > \sigma_2 > \ldots > \sigma_n > 0 \tag{4}$$

A description of this approach can be found in K. S. Arun, T. S. Huang, and S. D. Blostein, Least-Squares Fitting of Two 3-D Point Sets, *IEEE Trans. on Pattern Analysis and Machine Intelligence*, Vol. PAMI-9, No. 5, September, 1987, pp. 698-670; and in G. H. Golub and C. F. V. Loan, *Matrix Computations*, Baltimore, M; John Hopkins, 1996.

Following the teachings of those two references, a two at a time comparison is made between each target image $I_{Ti}$ and the reference image $I_R$. Let $p_i$ be the two dimensional set of points characterizing the reference image $I_R$ and $p_i'$ be the two dimensional set characterizing a target image $I_{Ti}$. The affine transformation between $p_i'$ and $p_i$ can be written:

$$p_i' = R_{Ti} p_i + TR_{Ti} + \overline{N}_i \tag{5}$$

where $R_{Ti}$ is a 3×3 rotation matrix, $TR_{Ti}$ is a translation vector (3×1 column) and $\overline{N}_i$ represents noise. The goal is to find the optimal $R_{Ti}$ and $TR_{Ti}$ to minimize:

$$\min_{R_{Ti}, TR_{Ti}} \Sigma^2 = \sum_{i=1}^{N} \| p_i' - (R_{Ti} p_i + TR_{Ti}) \|^2 \tag{6}$$

To solve for those optimal values, define the mean values, or centroids, of $\overline{p}$ and $\overline{p}'$ as follows:

$$\overline{p} = \frac{1}{N} \sum_{i=1}^{N} p_i \tag{7}$$

and $$\overline{p}' = \frac{1}{N} \sum_{i=1}^{N} p_i' \tag{8}$$

Now, define two error measures representing variability about the mean values in equations (7) and (8).

$$q_i = p_i - \overline{p} \tag{9}$$

$$q_i' = p_i' - \overline{p}_i'. \tag{10}$$

The SVD algorithm proceeds as follows:

Step 1: From $p_i$ and $p_i'$, calculate the mean values of $\overline{p}$ and $\overline{p}'$ using equations (7) and (8) and calculate the two error measures $q_i$ and $q_i'$ using equations (9) and (10).

Step 2: Calculate the 3×3 matrix H defined by:

$$H := \sum_{i=1}^{N} q_i q_i'^T \tag{11}$$

Step 3: Find the SVD of H as:

$$H = U \delta V^T \tag{12}$$

Step 4: Calculate the optimal $R_{Ti}$ to minimize equation (6) as:

$$\overline{R}_{Ti} = V U^T \tag{13}$$

Step 5: Calculate the optimal $\overline{TR}_{Ti}$) to minimize equation (6) as:

$$\overline{TR}_{Ti} = p' - \overline{R}_{Ti} p \tag{14}$$

and verify that the determinant of $TR_{Ti}$ is equal to +1.

The calculation is now complete.

Proof

Details of the proof of the solution presented by equations (3)-(14) are as follows.

Equation (6) can be rewritten as:

$$\Sigma^2 = \sum_{i=1}^{N} (q_i' - R_{Ti} q_i)^T (q_i' - R_{Ti} q_i) \tag{15}$$

where N denotes the number of pairs of points to be compared to a reference image.

Equation (15) can be rewritten as:

$$\Sigma^2 = \sum_{i=1}^{N} (q_i'^T q_i' + q_i^T q_i - 2 q_i'^T R_{Ti} q_i) \tag{16}$$

Therefore, minimizing $\Sigma^2$ of equation (15) is equivalent to maximizing F, where F satisfies:

$$F = \sum_{i=1}^{N} q_i'^T R_{Ti} q_i \tag{17}$$

or $$F = \text{Trace}\left( \sum_{i=1}^{N} R_{Ti} q_i q_i'^T \right) = \text{Trace}(R_{Ti} H) \tag{18}$$

where $$H = \sum_{i=1}^{N} q_i q_i'^T \tag{19}$$

The following lemma is from the Arun and Golub references. For any positive definite matrix $AA^T$ and any orthonormal matrix B, $$\text{Trace}(AA^T) > \text{Trace}(B\, AA^T) \tag{20}$$

Now, let the SVD of H in equation 11 be defined as:

$$H = U\delta V^T \quad (21)$$

where U and V are 3×3 orthonormal matrices and δ is a 3×3 diagonal matrix with non-negative elements.

Let $X = VU^T$ (which is orthonormal)  (22)

Then, $XH = VU^T U\delta V^T = V\delta V^T$  (23)

which is symmetric and positive definite. From the lemma above, for any 3×3 orthonormal matrix B, $$\text{Trace}(XH) > \text{Trace}(BXH) \quad (24)$$

Thus X maximizes F of equation (17) and defines an appropriate $\overline{R_{Ti}}$. Note that if the determinant det(X)=+1, this implies X is a rotation. If, however, det (X)=−1, this implies that X is a reflection which is the degenerate case and rarely occurs. Also note that with $\overline{R_{Ti}}$ now specified as the optimal solution of equation (6), then $\overline{TR_{Ti}}$ is specified via equation (14) as:

$$\overline{TR_{Ti}} = p' - \overline{R_{Ti}} p \quad (25)$$

Figure 4A:
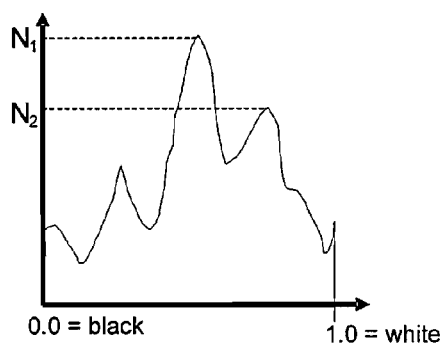
FIGS. 4a and 4b are histogram diagrams of intensity illustrating how to determine a scale factor for registering a target image to a reference image.
Figure 4B:
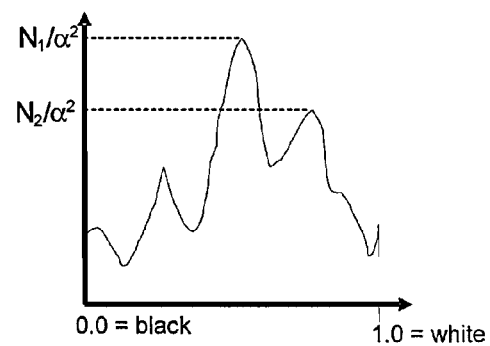

The just described first solution component provides optimal values for rotation and translation matrices. A scale factor is still required to complete equation (2). There are at least two ways to find optimum scale factor changes $SF_{Ti}$, for a given target image ITi. The first method is described in U.S. Pat. No. 7,030,808 to Repperger et al., incorporated by reference into this description, in which objects of different scale sizes were analyzed from their histogram plots of brightness (frequency of pixels versus brightness levels). FIGS. 4a and 4b show a comparison of two histogram plots of objects of various sizes (on a white background) versus brightness that differ by a linear dimension factor α. FIG. 4a is a plot of a normal sized image and FIG. 4b is a plot of an imaged scaled by linear dimension factor α. Because images are rectangular in nature, the histogram plots will be amazingly similar in shape but scaled by a factor $\alpha^2$. This is due to the fact that as the linear dimensions scale by a factor α, there are $\alpha^2$ number of pixels (frequency) affected by that brightness level. The best determination of the term $SF_{Ti}$ would be to find the optimal a so that the histograms fit in a least squares manner, that is, with minimum error from similar landmark points in the histogram plots.

The second method to select the best scale factor is to view the scale factor as an affine transformation defined by the relationship in equation (26). The output y represents a template matrix sliding through the initial image. Sx represents a scale factor along the x axis and Sy represents a scale factor along the y axis. The quantities Sx and Sy could be found from landmark points (spatially in the image) in a least squares sense using methods commonly existing in the literature today.

$$y = \text{output} = \begin{bmatrix} Sx & 0 & 0 \\ 0 & Sy & 0 \\ 0 & 0 & 1 \end{bmatrix} \quad (26)$$

where $\overline{SF_{Ti}}$, $\overline{R_{Ti}}$, $\overline{TR_{Ti}}$ denotes these optimum values.

Example Calculation

To illustrate the "skeletonization" effect of the first solution component, an example is worked consisting of an image involving a geometric figure as the reference image $I_R$. As before, two target images $I_{T1}$ and $I_{T2}$ will be combined with $I_R$ to produce a fused image $I_F$. The overall goal is that fused image $I_F$ combines important details about the target images and enhances the reference image in terms of its information content. In this example, the two target images are deliberately selected to provide additional information and do not require weighing of the second solution component. The images in this example were also constructed on a computer using MATLAB® (with its image processing toolbox) to apply equations (2) through (14) to produce the same result as shown in FIGS. 5-8.

Figure 5:
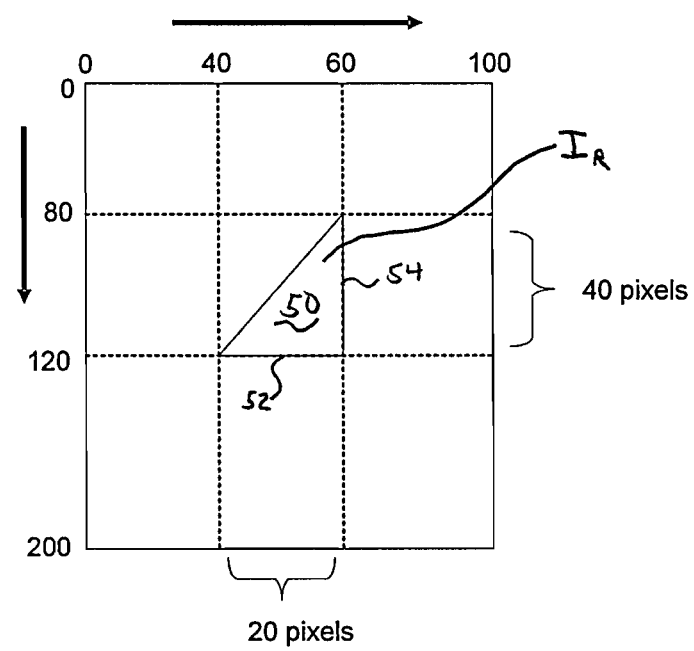
FIG. 5 is a graphical image of a hypothetical reference image.

The reference image $I_R$ in this example is a simple right triangle 50 on a white background as shown in FIG. 5.

The line widths of triangle 50 are one pixel wide. The dimensions of triangle 50 are 200 rows by 100 columns. The dimensions include a horizontal leg 52 of 20 pixels and a vertical leg 54 of 40 pixels.

Figure 6:
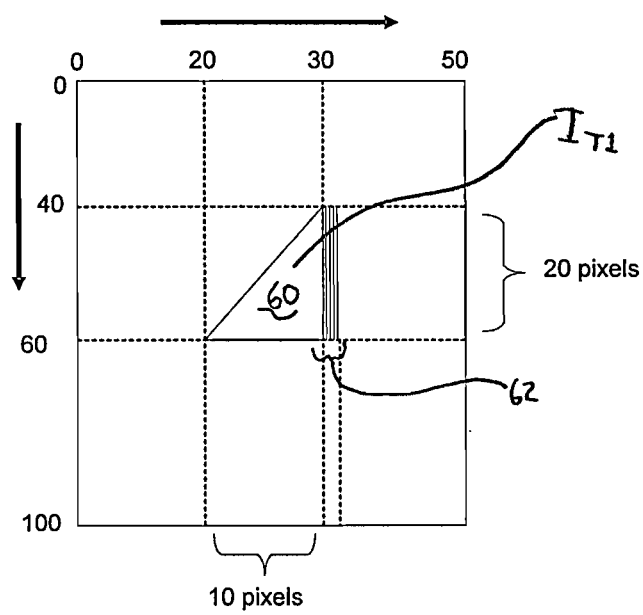
FIG. 6 is a graphical view of a hypothetical first target image for fusing with the reference image of FIG. 5.
Figure 7:
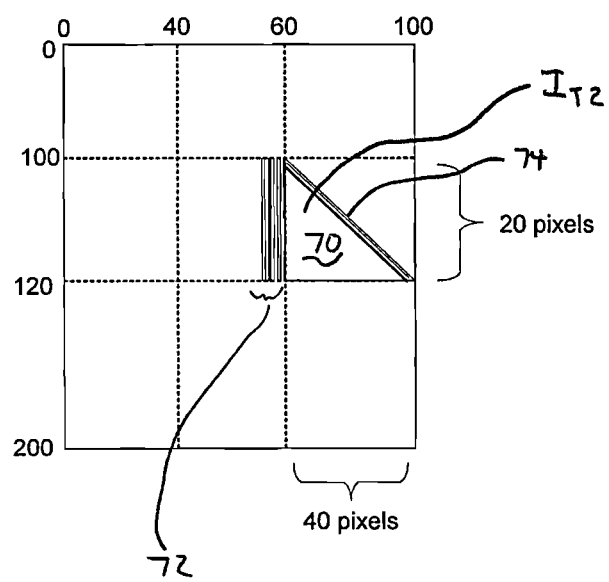
FIG. 7 is a graphical view of a hypothetical second target image for fusing with the reference image of FIG. 5.

A first target image $I_{T1}$, shown in FIG. 6 as triangle 60, represents a scaled down one-half size version of $I_R$ image 50, but has an edge enhancement consisting of a 3 pixel wide edge 62 on the right hand side of triangle 60. Thus, the operations necessary to fuse $I_{T1}$ to $I_R$ include scaling up $I_{T1}$ to double its size and adding a 3 pixel wide enhancement on its vertical leg of the triangle in a final fused image. Note that the aspect ratio between $I_{T1}$ and $I_R$ is preserved. The second target image $I_{T2}$, shown as triangle 70 in FIG. 7, is rotated clockwise 90 degrees in relation to reference $I_R$ image 50. In order to add more informational value, the shortest leg 72 is 3 pixels wide. Also, the hypotenuse 74 of triangle 70 is 2 pixels wide.

Figure 8:
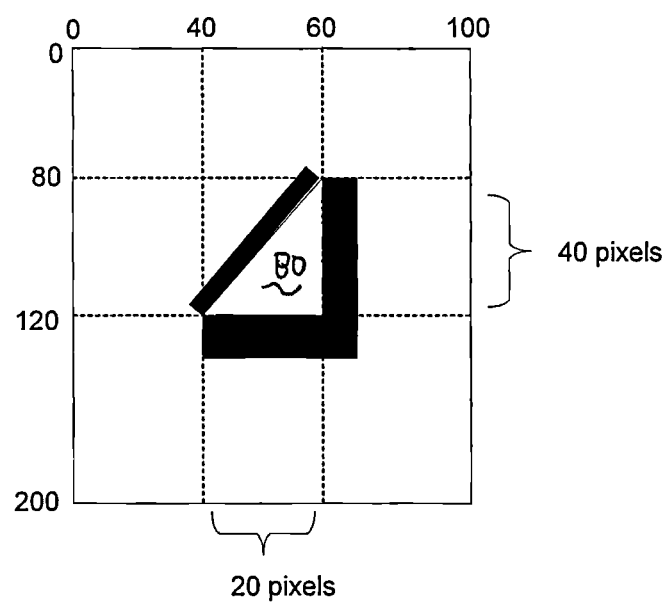
FIG. 8 is a graphical view of a hypothesized fused image constructed from the images of FIGS. 5-7.

In order to register and fuse the triangle 60 and triangle 70 representations of target images $I_{T1}$ and $I_{T2}$ with the triangle 50 representation of target image $I_{T2}$, triangle 60 must be scaled up and its double edge 62 added to a final fused image $I_F$. Triangle 70 must be rotated counter clockwise 90 degrees and its triple edge enhancement of leg 72 and its double edge of hypotenuse 74 added to $I_F$. FIG. 8 shows the desired hypothesized fused image 80 that includes all edge enhancements. Each target image has added new information (similar to the skeletonization concept) where edges are enhanced, thus enabling better detection of objects in the images.

Second Solution Component

Weighing Transformed Target Images for New Information

The first solution component of calibration and registration having been described, the second component solution is how to glean the best information from both within and across candidate target images $I_{Ti}$.

This second solution component uses a statistical approach to determine how to weigh the candidate $I_{Ti}$ images. As summarized in FIG. 3, the goal is to develop a procedure, that is, select $\lambda_i$, to weigh the set of target images $I_{Ti}$ in such a manner that they add new information content to the finally fused image. To demonstrate the method, a brief review of the likelihood function, from statistical detection theory, of two probability distributions illustrates this second component of the solution.

Figure 9:
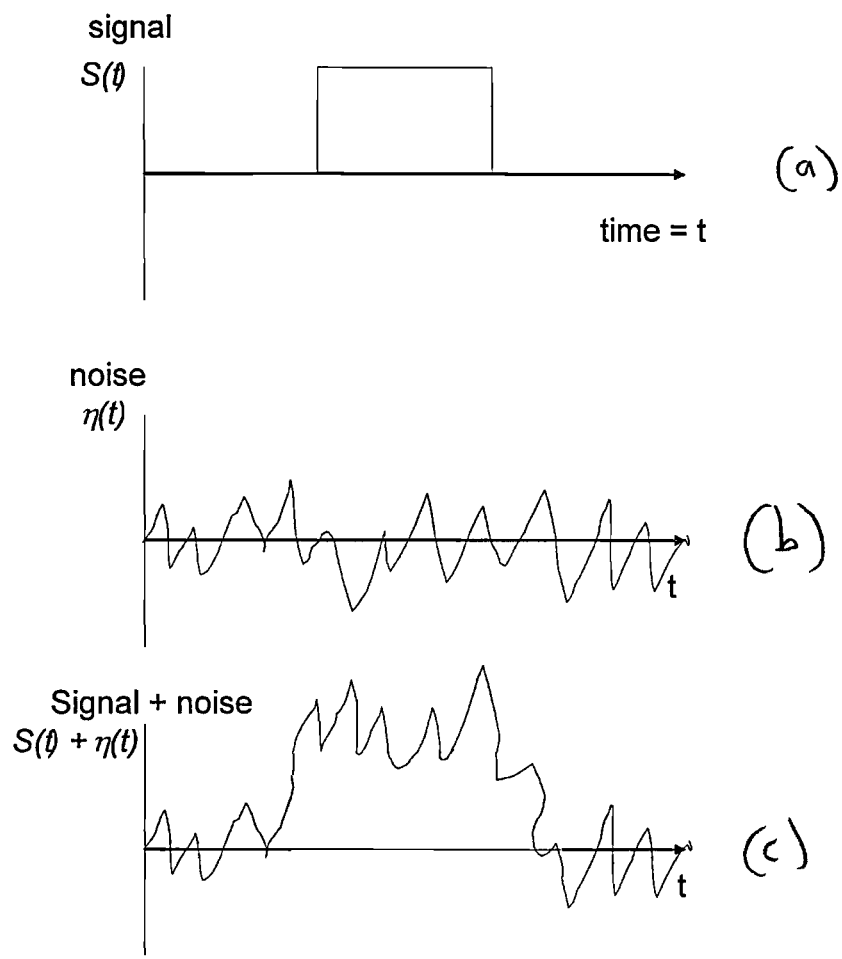
FIG. 9 is a graphical view of a signal alone, a zero mean noise source along and their sum.
Figure 10:
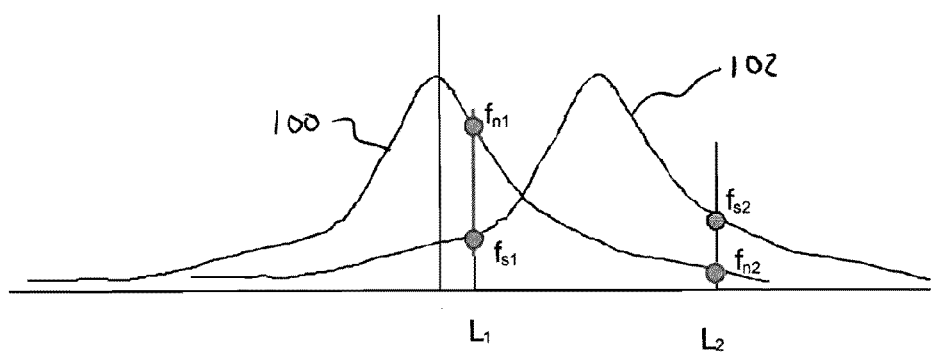
FIG. 10 is a graphical illustration of a hypothesized likelihood ratio test to discern the presence of a signal amid random noise.

Maximum likelihood methods are used in signal detection theory where the goal is to discern between a signal (which has non zero mean) and noise (which may be zero mean). FIG. 9 portrays a signal S(t) alone (a), a zero mean noise source η(t) alone (b), and their sum (S(t)+η(t)) (c). FIG. 10 shows the respective probability density distributions for this situation with a zero mean noise density 100 and a signal+noise density 102. The likelihood functions $L_1$ and $L_2$ for FIG. 10 are defined by their respective ratios with respect to the density functions as $L_1=f_{s1}/f_{n1}$ and $L_2=f_{s2}/f_{n2}$. There are four reasons why using maximum likelihood function ratios provides optimality to a decision rule for discerning whether noise alone is present versus the possibility of noise+signal, as described in D. Sorkin, S. Luan and J. Itzkowitz, "Group Decision and Deliberation: A Distributed Detection Process," Chap. 23 in Nigel Harvey & Derek Koehler (Eds.), *Handbook of Judgment and Decision Making*, Oxford, Blackwell, 2004, pp. 464-484. The benefits that likelihood ratios enjoy in decision-making processes include: (a) having a maximum hit rate for a fixed false alarm rate (commonly called the Neyman-Pearson criteria); (b) having the maximum expected value estimate; (c) providing maximum information transfer; and, (d) providing maximum difference between posterior distributions. These results are described in I. Y. Hoballah and P. K. Varshney, "An Information Theoretic Approach to the Distributed Detection Problem," *IEEE Transactions on Information Theory*, 35(5), 1989, pp. 988-994; and in R. Viswanathan and P. K. Varshney, "Distributed Detection with Multiple Sensors Part I—Fundamentals," *Proceedings of the IEEE*, 85, 1997, pp. 54-63, and provide a basis for a statistical optimality approach for how the images should be selected and weighted with importance $\lambda_i$, to add value in the sense of information to the fused image. With reference to FIGS. 5 and 6, the simple likelihood ratio test of the form:

$$\text{Choose } S(t)+\eta(t) \text{ over } \eta(t) \text{ alone if } L_i=f_{si}/f_{ni}>1 \tag{27}$$

is a basic decision rule which satisfies the four optimality criteria as just described. That is, selection of the appropriate target images $I_{Ti}$ can be converted into a simple identification problem of discerning signal versus noise and employing likelihood functions which enjoy these certain properties of optimality.

Application of this statistical approach, that is, converting the pertinent target image problem into a signal detection procedure, is as follows. As just described in the first solution component of the present invention, all the target images have been optimally registered in a least squares sense with the reference image $I_R$ in FIG. 1, as just described, but the question remains as to which of the target images adds new and relevant information? Also, certain target images may be correlated to each another (or with the reference image $I_R$) and collectively do not add value if they only provide similar information. This second optimality component is based on a sieve concept involving correlations and employing statistical procedures. The goal is to determine a procedure to calculate the $\lambda_i$ in FIG. 3.

An example implementation of this solution approach is as follows:

Step 1: Using the optimal $\overline{SF}_{Ti}$, $\overline{R}_{Ti}$, and $\overline{TR}_{Ti}$ factors as described in equations (13) and (25), transform each candidate tri image. Let the new transformed set of images be defined as $\hat{I}_{Ti}$, where $i=1, 2 \ldots n$ which have been optimally registered to the target image $I_R$.

Step 2: For each of the n, $\hat{I}_{Ti}$ target images, define n difference images:

$$D_{1i}=I_R-\hat{I}_{Ti}, \text{ where } i=1, 2 \ldots n \tag{28}$$

Step 3: Perform a correlation function operation on the difference matrices $D_{1i}$ to generate a matrix $\gamma_{1i}$ as follows:

$$\gamma_{1i}=\text{corr}(D_{1i}) \tag{29}$$

Let $\epsilon_{1i}$ denote a norm squared of the matrix $\gamma_{1i}$ such as the Frobenious norm:

$$\epsilon_{1i}=\|\gamma_{1i}\|^2_F \tag{30}$$

Note that the Frobenious norm of a matrix A may be easily calculated as:

$$\|A\|^{2F} = \sum_{i,j}^{n,m} (a_{ij})^2 \tag{31}$$

Step 4: A first pass through the difference matrices $D_{1i}$ has now been completed. Define a minimum threshold for $\epsilon_{1i}$ based on a threshold scalar quantity $\Delta>0$. The quantity $\Delta$ is determined from an image with only noise. We can now assign a certain number of the $\lambda_i$ values via the following rule:

Rule 1: For image $I_{Ti}$ if $\epsilon_{1j}=\|\gamma_{1j}\|^2_F<\Delta$ then assign
$$\lambda_j=\epsilon_{1j} \tag{32}$$

Thus $\lambda_j$ or image $\hat{I}_{T1}$ has been determined for FIG. 3. and image $\hat{I}_{T1}$ may be eliminated.

Step 5: To continue the sieve operation, assume $\hat{I}_{T2}$ has not been eliminated. If, at this point, $\hat{I}_{T2}$ has been eliminated, then move up to $\hat{I}_{T3}$, $\hat{I}_{T4}$ or the next higher target image that has not been eliminated. If $\hat{I}_{T2}$ has not been eliminated, then define a second set of difference matrices as follows:

$$D_{2j}=\hat{I}_{T2}-\hat{I}_j \text{ where } j=3, \ldots, n \tag{33}$$

and repeat the following calculations:

$$\gamma_{2j}=\text{corr}(D_{2j}) \tag{34}$$

$$\epsilon_{2j}=\|\gamma_{2j}\|^2_F \tag{35}$$

and invoke rule 2.

Rule 2: For image $\hat{I}_j$ if $\epsilon_{2j}=\|\gamma_{2j}\|^2_F<\Delta$, then assign
$$\lambda_j=\epsilon_{2j} \tag{36}$$

Again, this will eliminate some of the $\hat{I}_j$ images.

To continue, presume $\hat{I}_3$ has not been eliminated at this point. If $\hat{I}_3$ has been eliminated, then go to the next higher target image. Again, define a third difference matrix:

$$D_{3k}=\hat{I}_3-\hat{I}_k \text{ where } k=4 \ldots n \tag{37}$$

and repeat the following calculations:

$$\gamma_{3k}=\text{corr}(D_{3k}) \tag{38}$$

$$\epsilon_{3k}=\|\gamma_{3k}\|^2_F \tag{39}$$

and invoke rule 3.

Rule 3: For image $\hat{I}_k$ if $\epsilon_{3k}=\|\gamma_{3k}\|^2_F<\Delta$, then assign
$$\lambda_k=\epsilon_{3k} \tag{40}$$

Again, this will eliminate more of the $\hat{I}_k$ images.

The process now repeats itself with the next set of difference matrices (assuming $\hat{I}_4$ has not been eliminated up to this point).

$$D_{4l}=\hat{I}_4-\hat{I}_l \text{ where } l=5 \ldots n \tag{41}$$

until all $\lambda_k$ are defined. It may take up to n-1 rules, but all $\lambda_j$ will eventually be assigned in proportion to the contribution they add in a correlation sense. Also, if $\epsilon_{3k}$ in equation (40)$>\Delta$, then the remaining $\lambda_j$ may be set to their $\epsilon_{3k}$ values.

Proof

The optimality of the fused algorithms on any $T_i$ can be validated by showing that the decision rules given by equations (32), (36) and (40) on the classifications of target images En are optimal in a maximum likelihood sense.

First, note that the $\gamma_{1i}$, $\gamma_{2j}$ and $\gamma_{3k}$ of equations (29). (34) and (38) can be considered as random variables if the difference matrix was a simple noise source. Thus, they could be modeled as a normal Gaussian density function if the difference matrix did not contain a signal other than random noise.

Figure 11:
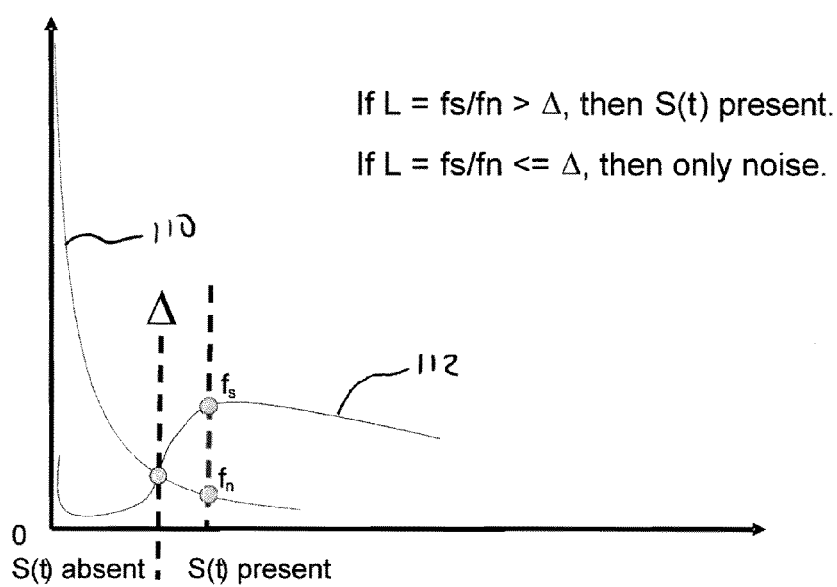
FIG. 11 is a graphical illustration of an $\chi^2$ distribution for a normal white Gaussian noise density alone and for a noise density having a non random signal.

Therefore, the random variable $\gamma_{km}$ plays the role of noise $\eta(t)$ in FIGS. 9 and 10. It then follows that the variable $\epsilon_{km}$ in equations (32), (35) and (39) represent the square of the normal distribution, which is known to follow a $\chi^2$ distribution with one degree of freedom as described in Papoulis, A., *Probability, Random Variables and Stochastic Processes*, McGraw Hill, Fourth Edition, 2002. Suppose, however, that each of the difference matrices $D_{km}$ in equations (28), (33) or (37) contains a signal, that is, a feature that should be included in the final fused image from the target image $T_i$, that was not random or zero mean? Then the variable $\gamma_{km}$ would not be zero mean and random like a white Gaussian noise source. Also, the variable $\epsilon_{km}$ would have a distribution that deviates significantly from the $\chi^2$ of one degree of freedom for a normal probability density function. This would be evidence of the signal S(t) in FIGS. 5 and 6. Thus the problem of distinguishing the signal S(t) from the noise $\eta(t)$ is equivalent to discerning if a feature adds value, that is, contains information other than noise. For the second case of the presence of S(t), the variable $\gamma_{km}$ would deviate from the $\chi^2$ distribution for normal noise and the goal is to detect the difference via a maximum likelihood test. FIG. 11 shows how the maximum likelihood test is implemented.

Plot 110 in FIG. 11 represents the $\chi_2$ distribution for a normal white Gaussian noise density alone (1 degree of freedom) and plot 112 represents the probability density function for the case when the $\gamma_{km}$ is not a zero mean random variable which implies the signal is present or that the target image provides new information to the decision making process. The likelihood ratio L is determined by the ratio of $f_s/f_n$ as shown in FIG. 11. If $L=f_s/f_n>\Delta$, then the decision is made that the signal S(t) is present. If, however, $L=f_s/f_n<\Delta$, then the decision is made of only noise being present (the target image is too correlated with either $I_R$ or some other $I_{Tj}$ and adds little new information to the final decision making process). This decision mechanism is consistent with rules 1, 2 and 3 as stated in equations (32), (36) and (40). Because this is a maximum likelihood rule, it enjoys the same properties of optimality as previously discussed.

Figure 12:
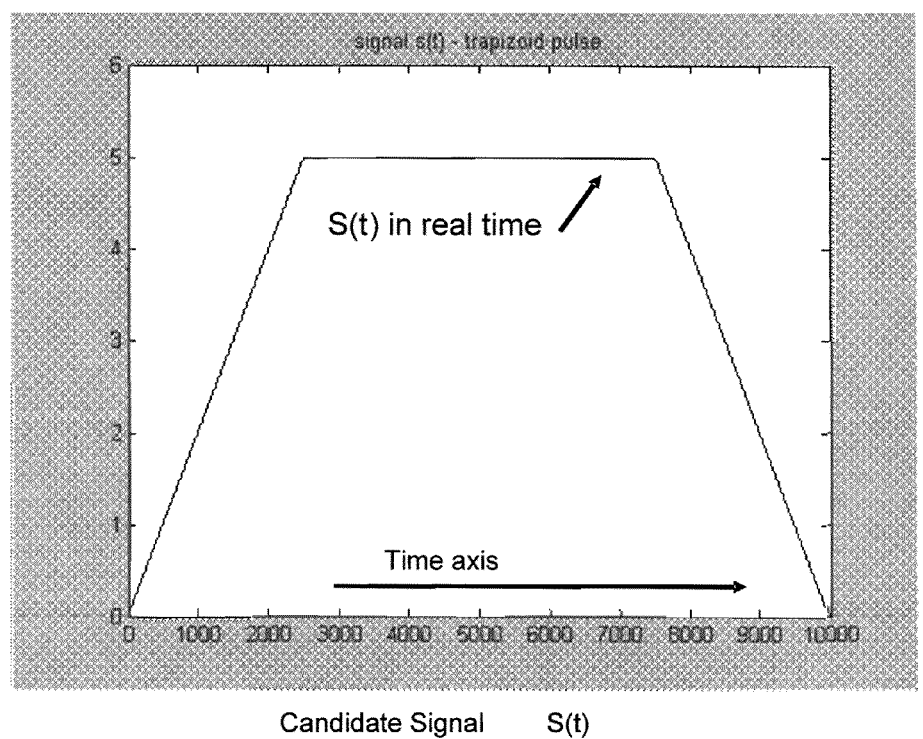
FIG. 12 is a graphical illustration of a trapezoidal candidate signal.
Figure 13:
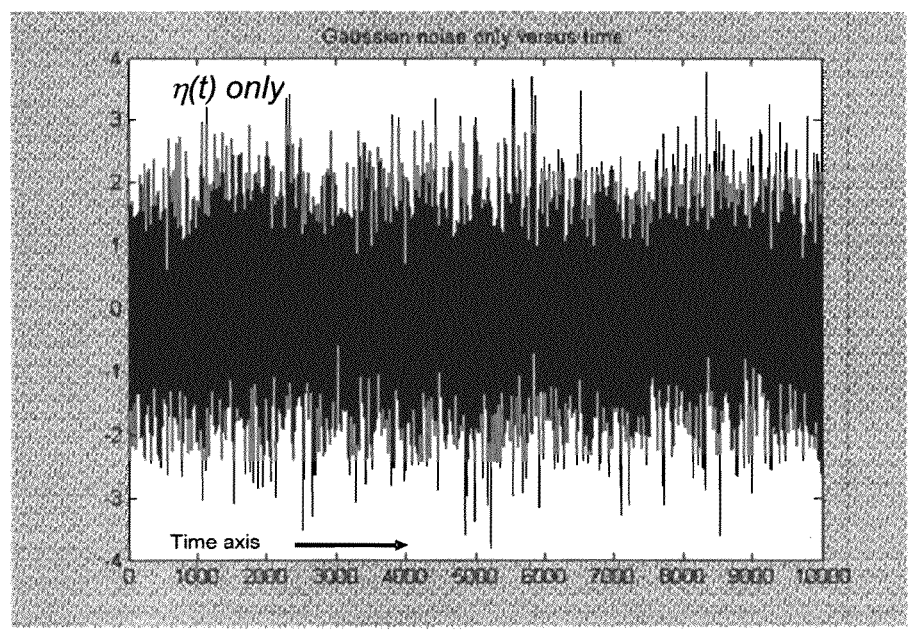
FIG. 13 is a graphical illustration of a normal white Gaussian noise signal.
Figure 14:
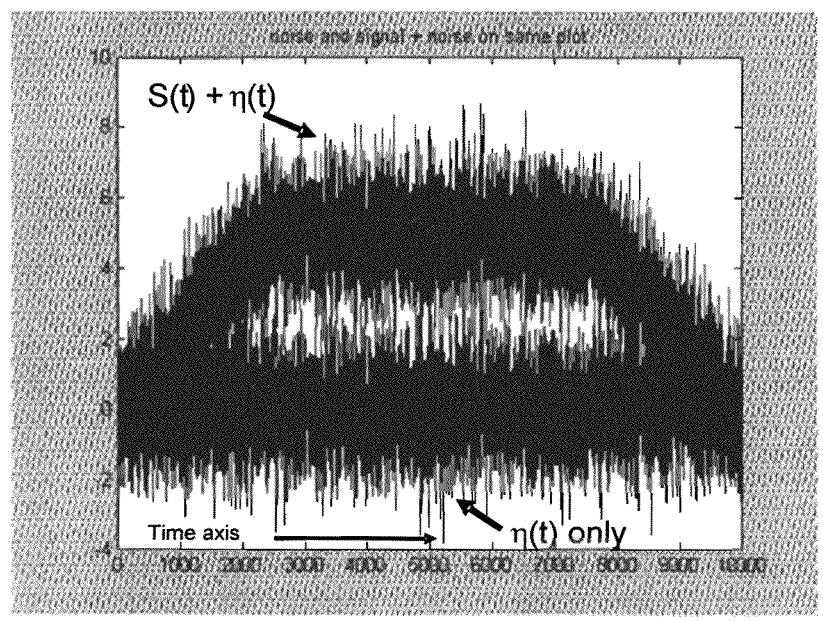
FIG. 14 is a graphical illustration of both the signal of FIG. 12 and the noise of FIG. 13.

To show the issues related to the prior arguments, a computer simulation was conducted. FIG. 12 shows a candidate signal S(t) for 10,000 data points which was constructed based on a trapezoidal function assumption for S(t). FIG. 13 displays a normal white Gaussian noise signal in real time being of zero mean with variance of unity. FIG. 14 portrays both signals together. These variables may be denoted via $\eta(t)$ and $S(t)+\eta(t)$, respectively. Two new variables are now computed:

$$Y\_\eta(t)=[\eta(t)]2 \tag{42}$$

$$Y\_S(t)+\eta(t)=[S(t)+\eta(t)]^2 \tag{43}$$

Figure 15:
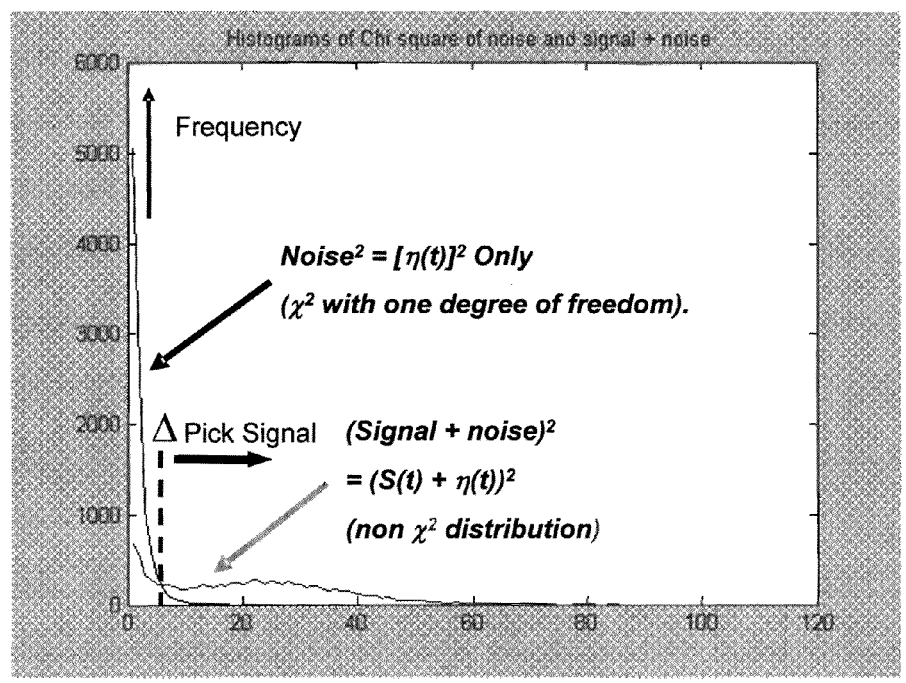
FIG. 15 is a graphical illustration of histogram plots for the variables illustrated in FIG. 14.

FIG. 15 illustrates the histogram plots of the variables given in equations (42) and (43) and in FIG. 14. The pure noise variable $Y\_\eta(t)$ shows the typical characteristics of a $\chi^2$ distribution of a normal white Gaussian noise signal with one degree of freedom. However, the second variable $Y\_S(t)\_\eta(t)$ portrays significant variations from the normal plot. Thus, the decision rule variable $\Delta$ would occur at the intersections of the two curves in FIG. 15, as indicated. Note that FIG. 15 can now be compared to FIG. 11, which is what has been hypothesized would occur for this type of simulation.

The teachings of the disclosed new and improved computer-implementable approaches for solving image analysis problems will find application in other analysis areas where computer-implementable computational solutions are required. Its teachings will be particularly valuable in other areas where computationally difficult problems, such as image fusion, can be recast as a statistical signal detection problem for which solution approaches are known, including the new solution approaches taught here.

Various modifications to the invention as described may be made, as might occur to one with skill in the art of the invention, within the scope of the claims. Therefore, all contemplated example embodiments have not been shown in complete detail. Other embodiments may be developed without departing from the spirit of the invention or from the scope of the claims.

We claim:

1. A method for determining an optimal rotational matrix $R_{Ti}$ and an optimal translation vector $TR_{Ti}$ for registering and calibrating a target image $I_{Ti}$ with a reference image $I_R$, wherein reference image $I_R$ is characterized as a two dimensional set of points labeled $p_i$, and target image $I_{Ti}$ is characterized as a two dimensional set of points labeled $p_i'$, such that:

$p_i'=R_{Ti}p_i+TR_{Ti}+\overline{N_i}$, where $R_{Ti}$ is a 3×3 rotation matrix; $TR_{Ti}$ is a 3×1 translation vector, and $\overline{N_i}$ represents noise;
comprising finding an $R_{Ti}$ and $TR_{Ti}$ to minimize:

$$\Sigma^2 = \sum_{i=1}^{N} \|p_i' - (R_{Ti}p_i + TR_{Ti})\|^2$$

by the steps of:
(a) defining mean values $\bar{p}$ and $\bar{p}'$ of, respectively, p and p' as:

$$\bar{p} = \frac{1}{N}\sum_{i=1}^{N} p_i$$

and $$\bar{p}' = \frac{1}{N}\sum_{i=1}^{N} p_i';$$

(b) defining two error measures representing variability about mean values $\bar{p}$ and $\bar{p}'$ as:

$q_i=p_i-\bar{p}$ $q_i'=p_i'-\bar{p}_i;$ (c) from $p_i$ and $p_i'$, calculating mean values $\bar{p}$ and $\bar{p}'$ according to step (a) and calculating the two error measures $q_i$ and $q_i'$ according to step (b);

(d) calculating a 3×3 matrix H defined as:

$$H := \sum_{i=1}^{N} q_i q_i'^T;$$

(e) finding the singular value decomposition of H as:

$H=U\delta V^T;$ (f) calculating the optimum $R_{Ti}$ to minimize the value of the equation in step (a) as:

$\bar{R}_{Ti}=VU^T$, and;

(g) calculating the optimal $\overline{TR}_{Ti}$ as:

$\overline{TR}_{Ti}=p'-\bar{R}_{Ti}p.$

* * * * *